United States Patent [19]
Park et al.

[11] Patent Number: 5,182,841
[45] Date of Patent: Feb. 2, 1993

[54] HYDRAULIC WHEEL CYLINDER TOOL

[76] Inventors: James M. Park, 1399 W. Berry Dr., Littleton, Colo. 80120; Ralph L. Stichter, 11741 Jackson St., Thornton, Colo. 80233

[21] Appl. No.: 817,632

[22] Filed: Jan. 7, 1992

[51] Int. Cl.⁵ ............................................. B25B 27/02
[52] U.S. Cl. ........................................... 29/229; 29/268
[58] Field of Search ................. 29/243.5, 243.56, 225, 29/229, 268; 81/426

[56] References Cited

U.S. PATENT DOCUMENTS

| | | | |
|---|---|---|---|
| 1,640,089 | 8/1927 | Murphy . | |
| 1,850,268 | 3/1932 | Kulp et al. . | |
| 2,471,372 | 5/1949 | Jankovich . | |
| 2,601,117 | 6/1952 | Graham | 29/268 |
| 3,823,462 | 7/1974 | Kanda | 29/268 |
| 3,882,586 | 5/1975 | Schmidt | 81/426 |
| 4,170,125 | 10/1979 | Minka | 29/268 |
| 4,499,796 | 2/1985 | Miller | 81/426 |
| 4,697,483 | 10/1987 | Rodgers . | |
| 4,793,046 | 12/1988 | Hart | 81/426 |
| 4,982,631 | 1/1991 | Lowther | 29/268 |
| 5,022,292 | 6/1991 | Hammer et al. . | |
| 5,050,466 | 9/1991 | Cameron . | |
| 5,058,414 | 10/1991 | Hoyes | 81/426 |

*Primary Examiner*—Robert C. Watson
*Attorney, Agent, or Firm*—James Creighton Wray

[57] ABSTRACT

The wheel cylinder retainer clip applying tool is a plier-like hand tool with widely spaces angularly related jaws that are oriented perpendicularly to the handles. At the tips of the jaws are opposed cylindrical grippers that are oriented on perpendicular axes. A first jaw is mounted on a spacer which extends outward from a pivot opposite a first handle. A second jaw extends outward from the pivot perpendicularly to a second handle. The second jaw has a semi-cylindrical cradle at its outer end for sporting the wheel cylinder body. The cradle is oriented around an axis parallel to the pivot axis. The first jaw has a high aspect ratio cylinder at the outer end, with a greater length than diameter. The cylinder is oriented at a slight angle outward from a direction parallel with the first handle. The remote end of the cylinder engages a ring of a retainer clip, presses the ring along the cylinder mounting extension and tends to flatten the ring after it contacts the plate, allowing prongs of the clip to ramp outward and then snap inward, locking the mounting extension and the wheel cylinder on the plate.

20 Claims, 2 Drawing Sheets

HYDRAULIC WHEEL CYLINDER TOOL

BACKGROUND OF THE INVENTION

Wheel cylinders for drum brakes are difficult to replace because no suitable tool exists for pressing a retainer clip into place.

A brake cylinder for drum-type brakes is mounted below the brake shoe retraction spring retainer on a brake backing plate fixed on an end of an axle housing. Typically, a brake cylinder has two pistons which move outwardly to apply brakes. Brake fluid is supplied between the pistons in the cylinder through a cylinder mounting projection. The mounting projection extends through an opening in the brake mounting plate. A circular steel clip is connected to the projection, anchoring the cylinder on the plate. A conventional retaining clip has a warped circular periphery with two radially opposed prongs which extend inward from opposite high points on the circle. The clip is made of spring steel. When the clip is pushed downward over the brake cylinder mounting projection the prongs are ramped outward. When the retainer is fully installed and the high points of the circle are flattened against spring force in the clip, ends of the prongs snap inward and engage shoulders on the cylinder mounting extension. With the ring of the retainer resting against the back of the brake mounting plate, the ends of the prongs are pressed inward against the shoulders, holding the cylinder mounting extension firmly in the plate, and holding the cylinder firmly against the outer side of the plate, in brake actuating position.

When it is necessary to remove and replace the cylinder, the retainer clip prongs are spread outwardly, and the cylinder mounting extension slides easily through the plate as the cylinder is removed.

Replacement of the cylinder is relatively easy. The projection on a new cylinder is slid through the brake plate on the axle housing in the opening provided for that purpose. Installation of a new retainer clip is difficult. While an outside force is holding the brake cylinder inwardly, the retainer clip must be pushed outwardly in the opposite direction to spread the prongs and snap the prongs under the shoulders of the mounting projection. The forces are substantial.

The retainer clip, which is made of spring steel is about 1/16" thick, has an outer diameter of about ⅝" and an inner diameter of about ¼", has two diametrically opposed retainer prongs which extend inward about 5/16" and which have bases about ¼" wide attached to the inner diameter of the ring, and which are about 5/16" wide at their flat inner ends. The flat inner ends of the prongs are flexed outward over ramps near the outer end of the mounting extension and rebound inward to engage shoulders under the ramps. Portions of the ring, which are 90° offset from the prongs, engage the inside of the brake backing plate. The rings of the retainer clips are warped so that the portions from which the prongs extend are urged by spring force away from the backing plate. As a consequence, spring forces urge the prongs inward and at the same time urge the prongs away from the backing plate. Ends of the prongs engage the shoulders of the cylinder mounting extension while the 90° offset portions of the rings are pressed against the backing plate. The spring force is substantial since it locks the cylinders in position. Substantial excessive force must be provided by the retainer clip to prevent unwanted dislodgement of the cylinder when an automobile is subjected to vibrations and shock.

When installing the retainer spring two substantial forces are required, the force to spread the prongs outwardly over the ramps and the force to deform the ring. The application of both of those forces tends to press the cylinder body away from the brake mounting plate and makes the affixation of the retainer clip extremely difficult. When using screwdrivers, for example, premature release of the clip may result in a violent projecting of a clip from its intended location, propelling the clip through space, and bouncing the clip off hard surfaces, with attendant danger to a mechanic.

Two screwdrivers are often used, which promotes frustration of the mechanic. The screwdrivers may do damage to the axle housing end plate, which is also called the brake backing plate. Much time is required, and the possibility of injury to the mechanic because of the forces applied and the spring nature of the retainer is ever present. Visual and manual access to the upper inside of the backing plate is difficult, which adds to the problem.

Many problems remain. The present invention is directed to solving the problems of applying a wheel cylinder retainer clip when installing a wheel cylinders.

SUMMARY OF THE INVENTION

The wheel cylinder retainer clip applying tool is a plier-like hand tool with widely spaces angularly related jaws that are oriented perpendicularly to the handles. At the tips of the jaws are opposed cylindrical grippers that are oriented on perpendicular axes. A first jaw is mounted on a spacer which extends outward from a pivot opposite a first handle. A second jaw extends outward from the pivot perpendicularly to a second handle. The second jaw has a semi-cylindrical cradle at its outer end for supporting the wheel cylinder body. The cradle is oriented around an axis parallel to the pivot axis. The first jaw has a high aspect ratio cylinder at the outer end, with a greater length than diameter. The cylinder is oriented at a slight outward angle from a direction parallel with the first handle. The remote end of the cylinder engages a ring of a retainer clip, presses the ring along the wheel cylinder mounting extension and tends to flatten the ring after it contacts the plate, allowing prongs on the clip to ramp outward and then snap inward, locking the mounting extension and the wheel cylinder on the plate.

A preferred hydraulic wheel cylinder tool has a hinge, a first lever connected to the hinge, and a second lever connected to the hinge. The first and second levers have respectively first and second handle portions and first and second jaw portions. The hinge is positioned in the levers between the respective jaw and handle portions whereby moving the handle portions toward each other moves the jaw portions toward each other. The first and second jaw portions extend generally perpendicular to the first and second handle portions. The first and second jaw portions have proximal ends near the hinge and distal ends remote from the hinge. A cylinder has one axial end connected to the distal end of the first jaw. The cylinder has an axis perpendicular to the hinge and generally parallel to the first handle portion. A concave depression in the distal end of the second jaw is formed about an axis generally perpendicular to the cylinder axis and generally parallel to the hinge.

The preferred tool of the present invention applies opposing forces to the wheel cylinder body and to the retainer clip as the retainer clip slides over the wheel cylinder mounting extension.

In a preferred embodiment, two parts of the tool are joined by a pivot. Each part has a handle and a force application end.

The major part of the tool has a long handle which extends more than six inches from the pivot, which is mounted in a flattened central portion of the part. The main part has a right angular section which extends from the flattened central portion. The proximal part of the right angular portion forms an angle of about 30° with respect to an axis of the handle. A distal working portion of the right angular part extends outward at approximately 90° from the proximal portion.

A steel cylinder having an inner diameter of about ⅜" and an outer diameter of about ½" and a wall thickness of about ⅛" is welded to the distal end of the distal part of the right angular working portion of the first member. The cylinder is about 2½" long. In a preferred embodiment, a base of the cylinder is grooved to receive the distal end of the working portion, and the grooved end of the cylinder is welded to the working portion by welding the working portion around the axial grooves in the end of the cylinder.

An axis of the cylinder is aligned at about 100° from the distal portion of the working portion of the first element. The distal end of the cylinder is open, so that the distal end may engage and press the retainer clip while freely receiving the mounting extension of the axle cylinder.

In a preferred embodiment, the tool has a second element with a handle of a length substantially similar to the first handle. The second element has a large flattened area through which the pivot extends.

An arm extends from the flattened pivot area of the second element at about 90° to the handle. A distal end of the arm supports an arcuate groove for resting against an outer central cylindrical surface of the brake cylinder body while the distal edge of the cylinder attached to the first arm presses the retainer onto the brake cylinder mounting extension, deforming the retainer so that edges of the prong snap under the ramp shoulders while portions of the ring are pressed tightly against the brake backing plate.

An arcuate cradle may be secured to the distal end of the second arm to spread the force over a large surface of the wheel cylinder.

These and further and other objects and features of the invention are apparent in the disclosure, which includes the above and ongoing written specification, with the claims and the drawings.

DETAILED DESCRIPTION OF THE DRAWINGS

Figure 1:
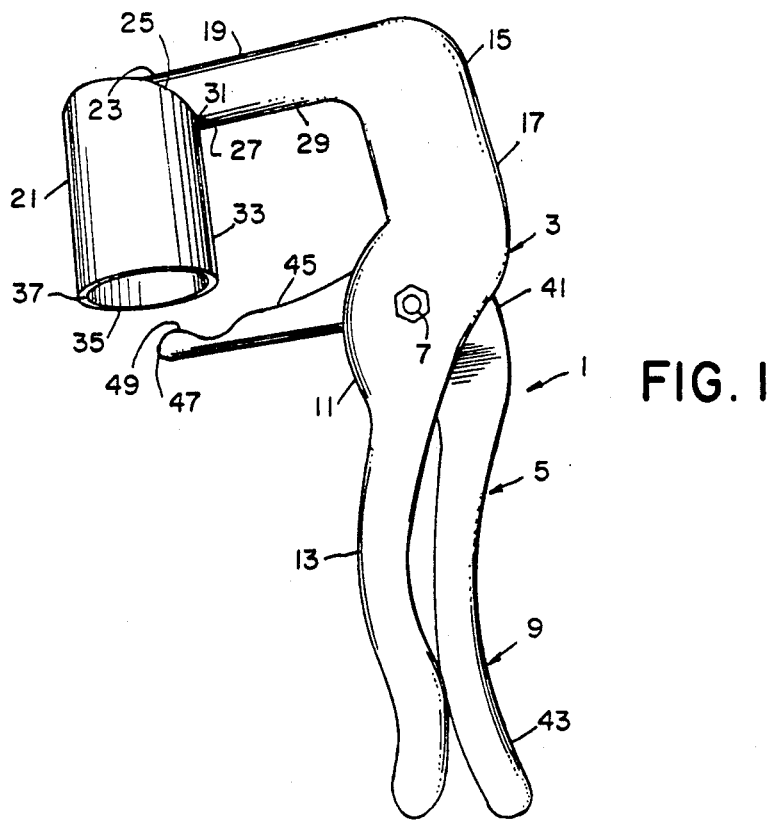
FIG. 1 shows a brake cylinder retainer clip tool of the present invention.

Referring to FIG. 1, the tool is generally indicated by the numeral 1. The tool has first and second parts 3 and 5 arranged in a scissor-like or pliers-like arrangement about a central pivot 7. Handles 9 are generally outwardly curved to augment gripping and prevent slipping in the environment which may be made damp and slippery by brake fluid or lubricants. The first portion 3 has a flattened central area 11 with a handle 13 extending in one direction, and with a working member 15 extending in the opposite direction. The working member has a first arm 17 which extends generally from the flattened area 11, and a second arm 19 which extends outward perpendicularly to the first portion 17. A cylinder 21 is mounted at a distal end 23 of the first arm. The cylinder preferably has an open proximal portion 25 which is slit 27 at diametrically opposite positions to receive the lower edge 29 of the arm 19. The cylinder is welded 31 to join the slots 27 and arm portions 29. The cylinder has a body 33 which extends outwardly generally perpendicular to arm 19 and parallel to arm 17, or preferably at an angle of about 100° with the lower surface 29 of the arm. A distal end 35 of the cylinder forms an opening to receive a brake cylinder mounting extension, while the thin annular edge 37 presses a retainer clip around the extension.

The second element 5 has a flattened central area 41 with an oppositely outwardly curved handle 43. A second arm 45 extends outward from the flattened area 41 at approximately 90° to the handle 43. A distal end 47 of the second arm has an arcuate member 49 which bears against the cylindrical wall of a middle portion of the brake cylinder while the retainer clip is being applied to the cylinder mounting extension.

In a preferred embodiment, the arcuate member 49 is formed around an imaginary axis which is perpendicular to an axis of the cylinder 21 and parallel to an axis of the pivot 7.

Figure 2:
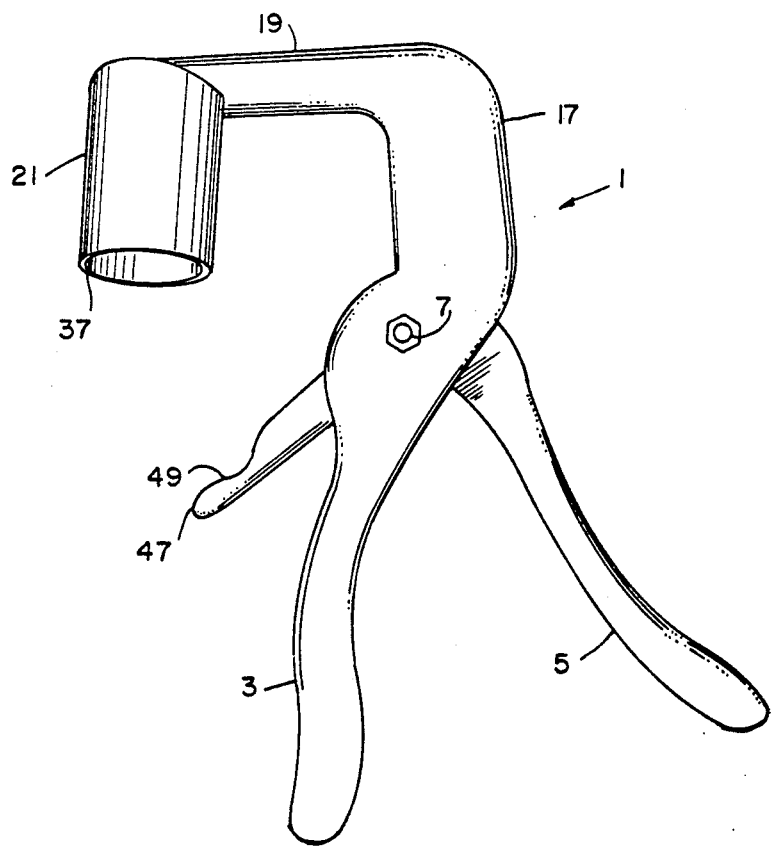
FIG. 2 shows the tool in an open position.

FIG. 2 shows a preferred tool 1 which has been opened so that the edge 37 of cylinder 21 may be placed against the crown of a warped annulus of retaining ring 51.

Figure 4:
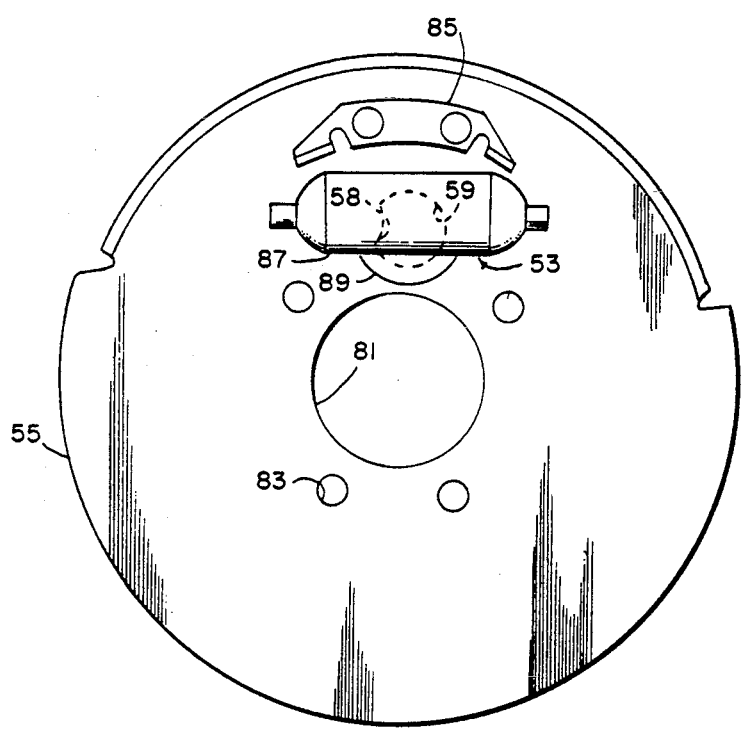
FIG. 4 shows a tool in a position in which the retainer clip prongs snap on the cylinder mounting extension shoulders.

As shown in FIG. 4, a brake cylinder 53 may be mounted on a backing plate 55 by extending the cylinder mounting extension 57 through an opening 59 with an anti-rotation aligning arc 58.

Figure 3:
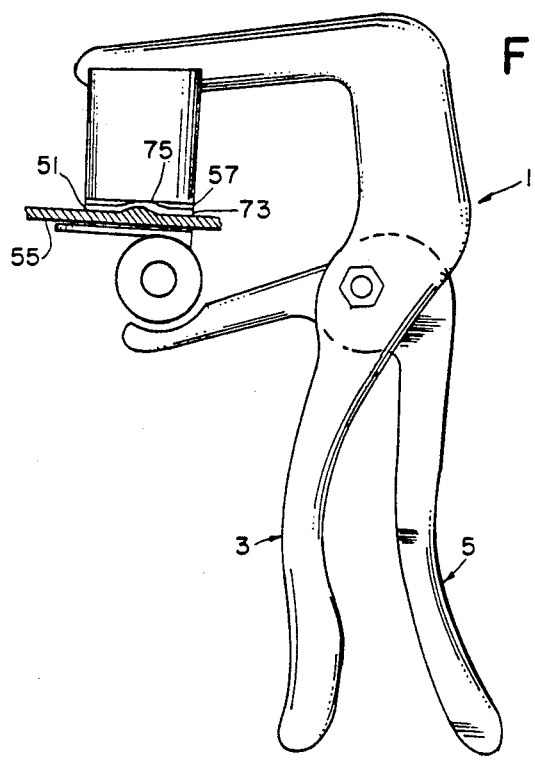
FIG. 3 is a front view of a brake backing plate with a wheel cylinder schematically shown.
Figure 6:
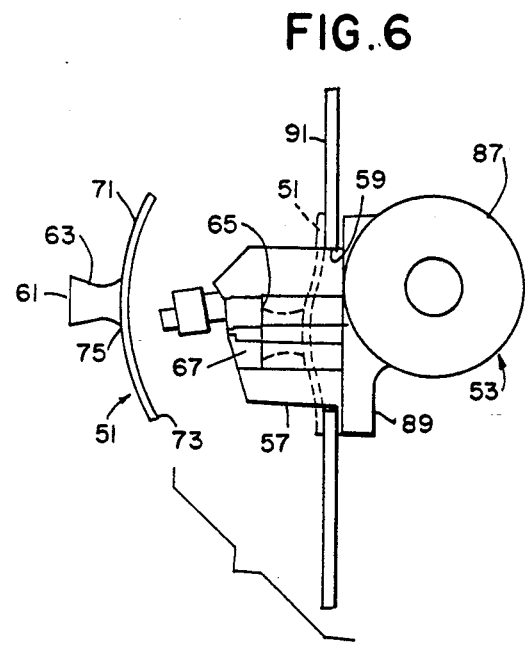
FIG. 6 is a cutaway sectional partial view showing the applying the wheel cylinder retaining clip.

As shown in FIGS. 3 and 6, tool 1 has compressed retainer 51 down over the wheel cylinder mounting extension 57 so that outer edges 61 of the diametrically opposite prongs 63 snap under the shoulders 65 of the ramps 67 on the cylinder mounting extension 57. The ring 71 of the clip is deformed so that portions 73 press against the backing plate 55 while portions 75, from which prongs 63 are inwardly extended, force the prongs upward to lock the edges 61 under the shoulder 65.

As schematically shown in FIG. 4, the brake backing plate 55 has a central opening 81 through which an axle extends. Openings 83 receive fasteners for mounting the backing plate on the outer end of an axle housing. Brake cylinder 53 is mounted on brake backing plate 55 below the retraction spring retainer 85.

The cylindrical body 87 of the brake cylinder has a mounting flange 89 which rests against a portion of the backing plate which surrounds opening 59, which receives the mounting extension 57.

Figure 5:
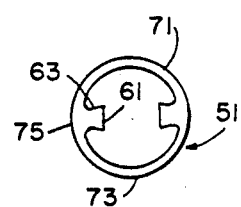
FIG. 5 shows a wheel cylinder retainer clip.

As shown in FIGS. 5 and 6, the retainer clip 51 is made of a ring 71 which has portions 75 from which retainer prongs 63 inwardly and upwardly extend. Inward distal ends 61 of the retainer prongs are trapped under shoulders 65 on the cylinder mounting extension 57. Upper and lower portions 73 of the retaining ring are pressed against the inside of the sloped portion 91 of the brake backing plate 55 to secure the cylinder tightly on the backing plate.

FIG. 6 is a partially sectional schematic elevation which shows the mounting of the brake cylinder 53 on a sloped portion 91 of the backing plate 55, holding the cylinder 53 with its flange 89 against the sloped portion 91 of the backing plate 55 while pressing the retainer clip 51 along the mounting extension 57 to secure the cylinder 53 to the slope portion 91, which presents problems of providing substantial forces in opposite directions around parts which are on opposite sides of a flange in difficult to reach areas. Heretofore, slippage of the spring retainer clips or applying implements in the difficult to reach and hard to see area caused frustration and danger to mechanics.

The present invention solves those problems by providing a special tool. While the invention has been described with reference to specific embodiments, modifications and variations of the invention may be constructed without departing from the scope of the invention, which is defined in the following claims.

We claim:

1. A hydraulic wheel cylinder retainer clip applying tool comprising a hinge, a first lever connected to the hinge, and a second lever connected to the hinge, the first and second levers having respectively first and second handle portions and first and second jaw portions, the hinge being positioned in the levers between the respective jaw and handle portions, whereby moving the handle portions toward each other moves the jaw portions toward each other, the first and second jaw portions extending generally perpendicular to the first and second handle portions, the first and second jaw portions having proximal ends near the hinge and having distal ends remote from the hinge, a cylinder having one axial end connected to the distal end of the first jaw portion, the cylinder having an axis perpendicular to the hinge and generally parallel to the first handle portion, a concave depression in the distal end of the second jaw portion, the concave depression being formed about an axis generally perpendicular to the cylinder axis and generally parallel to the hinge.

2. The tool of claim 1, wherein the cylinder attached to the first jaw portion has a high aspect ratio, with a length greater than its diameter.

3. The tool of claim 1, wherein the cylinder attached to the first jaw has an axis which is slightly angular extending outward from a line generally parallel with a line of the first handle.

4. The tool of claim 1, wherein the first jaw portion has a first part which extends generally radially outward from the hinge, and a second part which extends perpendicularly to the first part at an end of the first part remote from the hinge.

5. The tool of claim 4, wherein the cylinder is connected to a distal end of the second part, remote from the first part.

6. The tool of claim 5, wherein the cylinder has a slot in a first end for receiving an outer section of the second part, and wherein the first end of the cylinder is welded to the second part.

7. The tool of claim 6, wherein the cylinder has a flat outer edge for pressing against a warped ring of a retainer clip for tending to flatten the clip against a brake mounting plate, and wherein the cylinder has an open second end for receiving a mounting extension of a brake actuator.

8. A hand tool for applying a retaining clip on a mounting extension of a hydraulic actuator for drum brake shoes, comprising a pivot, first and second rigid elements connected to the pivot in a scissors arrangement, the first element having a first flattened central portion connected to the pivot, with an axis of the pivot extending perpendicular to the first flattened central portion, a first handle connected to the first flattened central portion, the first handle extending from the flattened central portion in a direction generally radial with respect to the pivot axis, an elongated extension having first and second ends, the first end of the extension being connected to the first flattened central portion, and the extension extending therefrom radially with respect to the pivot axis, an elongated first force applying member having first and second ends, a first end of the first force applying member being connected to the second end of the extension, and the first force applying member extending generally perpendicular to the extension, a brake actuator mount receiver connected to the second end of the first force applying member, the receiver having a first end connected to the second end of the first force applying member and having a second end spaced therefrom for contacting a retainer clip, the second element having a second flat portion mounted on the pivot parallel to the first flat portion and a second handle extending from the second flat portion generally radially with respect to the pivot axis, a second force applying member having first and second ends, the first end being connected to the second flattened portion and the member extending generally radially with respect to the pivot axis, a cradle near the second end of the second force applying member, the cradle facing the receiver for holding the side of a brake actuator while the second end of the receiver forces a retaining clip on the brake actuator mount.

9. The tool of claim 8, wherein the receiver is a cylinder attached to the first member and wherein the cylinder has a high aspect ratio, with a length greater than its diameter.

10. The tool of claim 9, wherein the cylinder attached to the first member has an axis which is slightly angular extending outward from a line generally parallel with a line of the first handle.

11. The tool of claim 10, wherein the cylinder is connected to a distal end of the first member remote from the extension.

12. The tool of claim 11, wherein the cylinder has a slot in a first end for receiving an outer section of the first member and wherein the first end of the cylinder is welded to the first member.

13. The tool of claim 12, wherein the cylinder has a flat outer edge for pressing against a warped ring of a retainer clip for tending to flatten the clip against a brake mounting plate, and wherein the cylinder has an open second end for receiving a mounting extension of the brake actuator mount.

14. A retaining clip applying tool for a brake actuator comprising a pivot pin and first and second members mounted on the pivot pin, the first and second members respectively having first and second handles, and having first and second spaced jaws generally perpendicularly oriented with respect to the handles, the first jaw having a cylindrical receiver oriented generally perpendicular to the pivot pin, and the second jaw having a generally partially cylindrical cradle opposite an open end of the receiver, the cradle being formed about an axis generally parallel to the pivot pin and perpendicular to the cylindrical receiver.

15. The tool of claim 14, wherein the cylindrical receiver attached to the first jaw has a high aspect ratio, with a length greater than its diameter.

16. The tool of claim 15, wherein the cylindrical receiver attached to the first jaw has an axis which slightly angularly extends outward from a line generally parallel with a line of the first handle.

17. The tool of claim 15, wherein the first jaw has a first part which extends generally radially outward from the pivot pin, and a second part which extends perpendicularly to the first part at an end of the first part remote from the pivot pin.

18. The tool of claim 17, wherein the cylindrical receiver is connected to a distal end of the second part, remote from the first part.

19. The tool of claim 18, wherein the cylindrical receiver has a slot in a first end for receiving an outer section of the second part, and wherein the first end of the cylindrical receiver is welded to the second part.

20. The tool of claim 19, wherein the cylindrical receiver has a flat outer edge for pressing against a warped ring of a retainer clip for tending to flatten the clip against a brake mounting plate, and wherein the cylindrical receiver has an open second end for receiving a mounting extension of a brake actuator.

* * * * *